Nov. 14, 1967   MINORU IKEDA   3,351,957

PORTABLE STEAM BATH

Filed Nov. 23, 1964   3 Sheets-Sheet 1

Minoru Ikeda
INVENTOR.

BY George B. Oujevolk
Attorney

Minoru Ikeda
INVENTOR.

BY George B. Oujevolk
Attorney

United States Patent Office 3,351,957
Patented Nov. 14, 1967

3,351,957
PORTABLE STEAM BATH
Minoru Ikeda, Kitatama-gun, Tokyo, Japan, assignor to France Bed Company Limited, Tokyo, Japan, a corporation of Japan
Filed Nov. 23, 1964, Ser. No. 413,137
1 Claim. (Cl. 4—164)

This invention relates to improvements of miniaturized portable steam baths and more particularly to portable steam baths having improved means for ejecting steam into steam cabinets.

Well known steam baths, especially miniaturized portable steam baths, are designed such that their steam cabinets accommodate human bodies excepting heads and necks and that sufficiently heated steam is ejected into the cabinets through nozzles opening therein. However, it is often difficult to uniformly steam human bodies owing to lack of uniform convection and mixing of steam ejected into the cabinet. Thus, while the upper half of the body can be heated sufficiently, lower half, i.e. lower portions of feet are not steamed satisfactorily, thus decreasing the merit of steam baths.

Also in the region near steam nozzles there is a danger that accident of burn may be resulted from relatively high temperature steam ejected in the cabinet.

Accordingly, it is an object of this invention to provide an improved portable steam bath wherein its steam cabinet is always filled with steam having uniform temperature throughout the interior thereof.

A further object of this invention is to provide a novel steam bath which is easily foldable for transportation.

A still further object of this invention is to provide a portable steam bath provided with a simple and efficient source of steam, thus enabling to use the steam bath in any place.

Another object of this invention is to provide a novel portable steam bath which can be easily folded and of small size so that it is convenient to transport to any desired place and can be operated at its best condition.

While the features of the invention are specifically defined in the appended claims, the invention will be more readily understood from the following detailed description, taken in conjunction with the accompanying drawing wherein:

Figure 1:
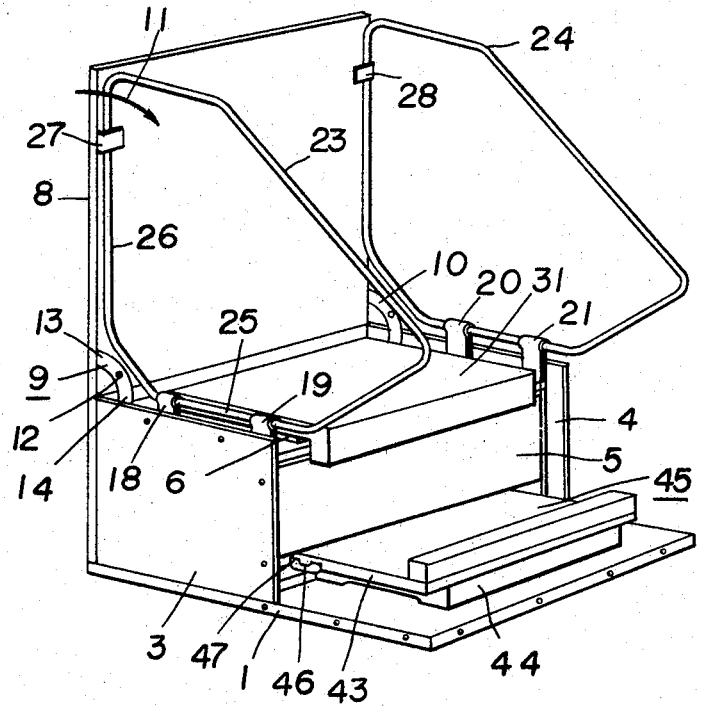
FIG. 1 shows a perspective view of a main body of a portable steam bath embodying this invention with a cover removed.

Referring now to the accompanying drawing, the main body of a steam bath constructed in accordance with this invention comprises a rectangular base plate 1 to be directly placed on floors, which may be made of a synthetic resin or wood having surfaces treated with water proof agent. Along one edge of the base plate 1 is mounted a vertical rear wall 2 (see FIG. 2) and vertical side walls 3 and 4 are secured to the opposite side edges of the base plate 1 and the rear wall 2, said side walls being extending from the rear edge of the base plate 1 to substantially middle portion thereof. A fore wall 5 is provided in spaced parallel relation with respect to the rear wall 2 between the side walls 3 and 4, and a top plate 6 is mounted upon the upper edge of the fore wall 5 to abut against the inner surfaces of the rear and side walls whereby to define a cavity 7 by means of rear, and side walls 2, 3, 4 and 5, the base plate 1 and the top plate 6.

A back plate 8 is connected to the side walls 3 and 4 by means of hinge members 9 and 10 to be swingable to the position above the rear wall 2 in vertical alignment therewith. Thus the back plate 8 can be rotated in a direction shown by an arrow 11 to the horizontal position. Each of the hinge members 9 and 10 comprises a pair of arcuate metal strips 13 and 14 pivotally interconnected by a pin 12 at one end and connected to side walls 3, 4 and the rear wall 8, respectively, at the opposite ends. The inner surface of the back plate 8 is lined with a cushioning layer 17 comprising a resilient layer 15 made of porous synthetic resin and the like and a sheet 16 of water proof material.

Figure 3:
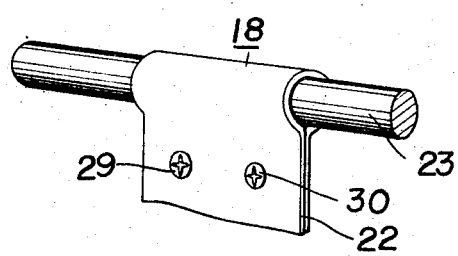
FIG. 3 shows an enlarged perspective view of a frame mounting fixture of the steam bath shown in FIGS. 1 and 2.

Pairs of spaced apart frame mounting fixtures 18, 19 and 20 and 21 are secured on the inner surfaces of the side walls 3 and 4, respectively along the upper edges thereof. These mounting fixtures have the same construction, and as illustrated in FIG. 3, each fixture (for example, 18) comprises a stamped metal plate 22 which is folded back upon itself to form an aperture at its bend to receive a frame 23. The legs of the folded plate are secured together into a rigid structure by means of machine screws 29 and 30.

Each pair of mounting fixtures 18, 19 and 20, 21 receives respective one of the frames 23 and 24 to pivotally connect them to the side walls 3 and 4 respectively. Each of the frames 23 and 24 comprises an endless metal pipe with two sides 25 and 26 which are perpendicular with each other. Horizontal sides 25 of the frames extend through the perforations of the mounting fixtures while the other sides 26 are adapted to be caught by anchoring members 27 and 28 secured to the opposite sides of the back plate 8 when the frames are brought to the vertical position as shown in FIG. 1. Under this condition the frames 23 and 24 are held in their operating positions by the back plates 8 while the back plate 8 is fixed in its vertical position in alignment with the rear wall by means of the frames 23 and 24.

Figure 4:
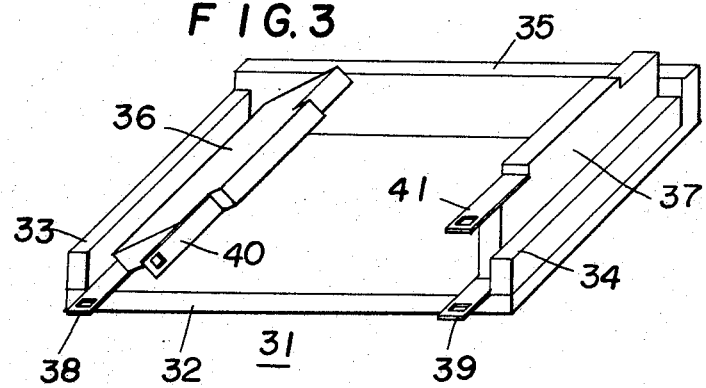
FIG. 4 shows a perspective view, as viewed from the back of a base portion of the steam bath with the sitting plate removed.

A sitting plate 31, having a construction as shown in FIG. 4, is mounted upon the top plate 6 of the cavity 7. This sitting plate comprises a flat wooden plate 32 having side legs 33 and 34 on the back surface thereof and a steam guard plate 35 under the fore lower edge. In order to selectively adjust the height of the sitting plate 31 above the cavity 7 a pair of auxiliary legs 36 and 37 are pivotally connected on the inner sides of the legs 33 and 34, respectively. Thus when the auxiliary legs are used as shown by the right hand leg 37 in FIG. 4 the height of the sitting plate 31 can be increased. Apertured anchoring members 38 and 39 are secured to the rear ends of the back surface of the flat plate 32, while similar apertured anchoring members 40 and 41 are secured to the rear ends of the auxiliary legs 36 and 37 respectively to project therefrom, said apertures being adapted to selectively receive projections 42 secured on the upper surface of the top plate 6 (see FIG. 2) thus fixing the position of the sitting plate 31 above the cavity 7.

Upon the base plate 1 and in front of the cavity 7 is mounted a foot pedestal 45 comprising a flat plate 43 and a leg 44 in the form of a frame secured to the front and side edges of the flat plate 43. On the opposite sides of the foot pedestal 45 and adjacent the cavity 7 are secured projections 46 which are adapted to engage anchoring projections 47 secured to the front plate 5 of the cavity 7 so as to fix the foot pedestal.

Figure 2:
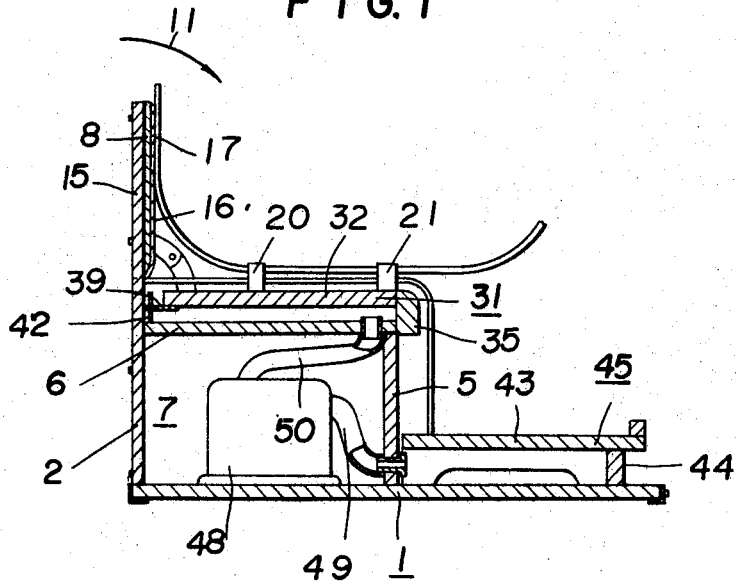
FIG. 2 shows a section of a cavity of the steam bath shown in FIG. 1 containing a steam generator.

As shown in FIG. 2 a steam generator 48 is housed in the cavity 7 which directly supplies generated steam to just below the sitting plate 31 and the foot pedestal 45 respectively through pipes 50 and 49 extending through the top plate 6 and the front wall 5, respectively.

Figure 5:
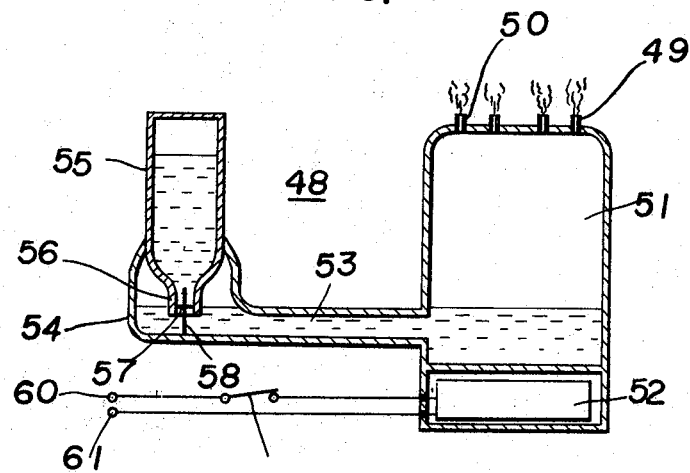
FIG. 5 is a sectional view of a steam generator disposed in the cavity.

FIG. 5 shows a construction of the steam generator 48 which comprises a closed steam generating chamber 51 containing an electric heater 52 in the bottom and pipes 49 and 50 connected to the top wall of the chamber. One end of a horizontal feed water pipe 53 is connected to the side wall of the steam generating chamber 51 adjacent its bottom while the other end of the pipe 53 is terminated with an upright dish shaped member 54 which is adapted to receive an inverted feed water tank 55 filled with water whereby to feed water from the tank 55 to the interior of the steam generating chamber 51. When the water level in the chamber 51 reaches the level of the mouth 56 of the water tank 55 supply of water is interrupted automatically and thereafter water will be fed as the water level in the chamber 51 decreases. A suitable valve 57 normally biassed to the closed position by a spring, not shown, is provided in the mouth 56 of the feed water tank 55, which is arranged to be opened by a valve stem 58 when it engages the bottom wall of the dish shaped member 54 after the tank has been inserted therein. The electric heater 52 is connected to a suitable source of supply via a thermal switch 59 and a pair of terminals 60 and 61. The thermal switch 59 is located in a steam cabinet to be described later and is constructed to open its contact by means of a bimetal, for example, in response to a predetermined rise in the temperature of the interior of the steam cabinet.

Figure 6:
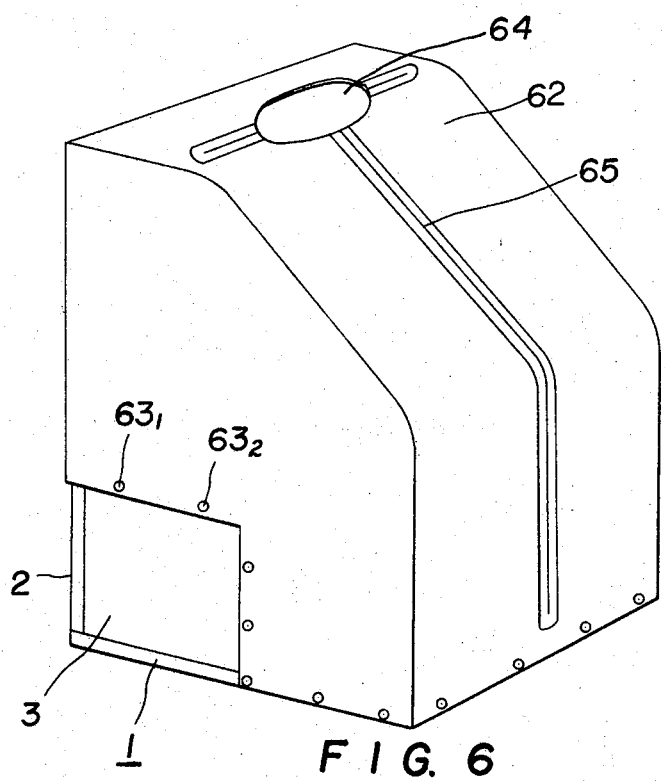
FIG. 6 shows a perspective view of a steam bath assembled for use.

FIG. 6 shows a perspective view of an assembled steam bath wherein a cover 62 is mounted to surround the main body of the steam bath which has been described hereinabove by referring to FIGS. 1 to 5 inclusive, whereby to form a steam cabinet. The cover 62 is mounted over the back plate 8, and the frames 23 and 24 with its periphery secured to the rear surface of the back plate 8, side surfaces of the side plates 3 and 4 and the periphery of the base plate 1 by means of suitable securing means such as buttons $63_1$, $63_2$ etc. A neck hole 64 is provided at the center of the top surface of the cover 62 and the cover is slit downwardly beginning with the neck hole 64, said slit can be closed or opened as desired by means of a slide fastener 65. It is to be understood that the cover is made of a suitable moisture proof heat insulating material such as a sheet of porous synthetic rubber sandwiched between two sheets of water proof material.

Figure 7:
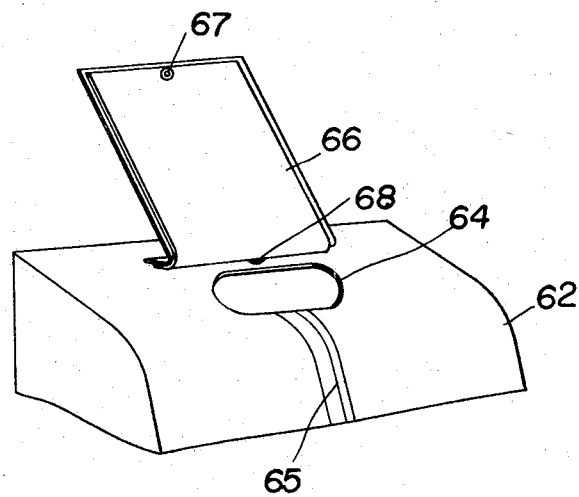
FIG. 7 shows a perspective view of the top portion of the steam bath with a pillow removed.

Although not shown in FIG. 6 an air bag 66 in the form of a flat plate is secured to the rear of the neck hole 64 of the cover 62, as shown in FIG. 7. On the upper and lower edges of the air bag 66 are secured buttons 67 and 68 which are adapted to engage with each other to fold the air bag 66 into a cylindrical shape, thus providing a comfortable pillow to the rear of the neck hole. When buttons 67 and 68 are disengaged the air bag can be used to close the neck hole 64 so as to substantially seal it while steam is admitted in the steam cabinet prior to its use.

As can be readily understood from the foregoing description, in the steam bath constructed in accordance with this invention steam is ejected into the steam cabinet on the rear sides of the sitting plate 31 and the foot pedestal 45 through pipes. Thus the ejected steam will flow into the steam cabinet around the peripheral edges of the sitting plate 31 and the foot pedestal 45 so that hot steam coming from the steam generator 48 can sufficiently heat the waist and feet of the human body and is prevented from directly contacting human body and assured to come into contact after its temperature has been decreased to a suitable value. Thus the high temper steam will be uniformly introduced into the steam cabinet from its lower periphery and then mixed with steam of lower temperature, thus producing a steam bath of uniform temperature.

Irrespective to small sized foldable construction, the portable steam bath embodying the principle of this invention can provide a unique steaming action for human bodies and can be easily utilized in any place in living houses.

Various other modifications of this invention will become apparent to those skilled in the art. All such variations and deviations which basically rely on the teachings through which this invention has advanced the art are properly considered within the spirit and scope of this invention.

What is claimed is:

A portable steam bath comprising a base plate, a cavity defined on the upper rear portion of said base plate by four walls perpendicular to said base and a top cover, a back plate foldably mounted on the rear upper edge of the rear wall of said cavity, a pair of frames pivotally connected to the upper edges of the opposite side walls and adapted to be secured to said back plate, a cover adapted to define a steam cabinet on said base plate together with said pair of frames and said back plate, said cover being being provided with a neck opening at its upper surface and a slit selectively opened and closed with a slide fastener, the peripheral edge of said cover being fastenable to the periphery of said base plate, to the sides of said cavity and to the periphery of said back plate by means of buttons, a sitting plate mounted above said cavity with a gap therebetween, a foot pedestal mounted upon said base plate in front of said cavity, and a steam generator disposed in said cavity to eject steam into spaces below said sitting plate and said foot pedestal, said steam generator comprising a steam generating chamber with pipes leading to the steam cabinet, a feed water tank to maintain a constant water level in said steam generating chamber; and, an electric heater located at the lower portion of said steam generating chamber and passages between the seat and foot rest and the side walls of said steam cabinet so as to introduce steam into said steam cabinet around the peripheries of said sitting plate and said foot pedestal so that hot steam can sufficiently heat the waist and feet of the human body within the steam bath but is prevented from directly contacting the human body before its temperature has been decreased to a suitable value.

References Cited

UNITED STATES PATENTS

| | | | |
|---|---|---|---|
| 579,580 | 3/1897 | Holm | 4—164 |
| 641,386 | 1/1900 | Hettrick | 4—164 |
| 712,436 | 10/1902 | Pfister-Schmidhauser | 4—164 |
| 1,464,093 | 8/1923 | Friedlander | 4—164 |
| 1,644,402 | 10/1927 | Rosswinkle | 4—164 |
| 2,326,035 | 8/1943 | Jessup | 4—164 |
| 2,858,547 | 11/1958 | Baumann | 4—160 |
| 3,092,843 | 6/1963 | Wright | 4—164 |

LAVERNE D. GEIGER, *Primary Examiner.*

B. E. KILE, *Assistant Examiner.*